(12) United States Patent
Xu

(10) Patent No.: US 7,366,126 B2
(45) Date of Patent: Apr. 29, 2008

(54) MODIFIED-BEACON, BANDWIDTH-ACCESS CONTROL IN WIRELESS NETWORK COMMUNICATION SYSTEM

(75) Inventor: Shugong Xu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 950 days.

(21) Appl. No.: 10/650,188

(22) Filed: Aug. 28, 2003

(65) Prior Publication Data
US 2004/0092268 A1 May 13, 2004

Related U.S. Application Data

(60) Provisional application No. 60/424,918, filed on Nov. 8, 2002.

(51) Int. Cl.
*H04J 3/08* (2006.01)
(52) U.S. Cl. .................................. 370/326; 370/329
(58) Field of Classification Search ............... 370/329, 370/319, 326, 337, 374
See application file for complete search history.

(56) References Cited

U.S. PATENT DOCUMENTS

2002/0075869 A1   6/2002  Shah et al.

FOREIGN PATENT DOCUMENTS

| EP | 1189388 | 3/2002 |
| WO | WO0171981 | 9/2001 |
| WO | WO0237754 | 5/2002 |

OTHER PUBLICATIONS

Shellhammer, Steve, "IEEE 802.15.2 Clause 14.1—Collaborative Coexistence Mechanism", IEEE, Jul. 2001.*

* cited by examiner

*Primary Examiner*—Seema S. Rao
*Assistant Examiner*—Wanda Z Russell
(74) *Attorney, Agent, or Firm*—Jon M. Dickinson, P.C.; Robert D. Varitz, P.C.

(57) ABSTRACT

Apparatus and a method employable in a wireless communication network for managing, among plural communication stations in a group of such stations, bandwidth-sharing of available, unused bandwidth. Implementation and practice of the invention involve (a) establishing a pattern of periodic beacon transmissions having a defined first time spacing between time-next-adjacent transmissions, which transmissions are designed, nominally, to convey bandwidth-availability (transmission-budget) announcements to stations in the group, (b) from within this pattern, choosing a sub-pattern of selected, periodic beacon transmissions having a defined second time spacing between time-next-adjacent, chosen sub-pattern transmissions, which second time spacing encompasses a predetermined number of the beacon transmissions having the mentioned first time spacing, and then (c) utilizing only the selected beacon transmissions in this sub-pattern to convey the announcements of any new (changed) transmission-budget information.

4 Claims, 1 Drawing Sheet

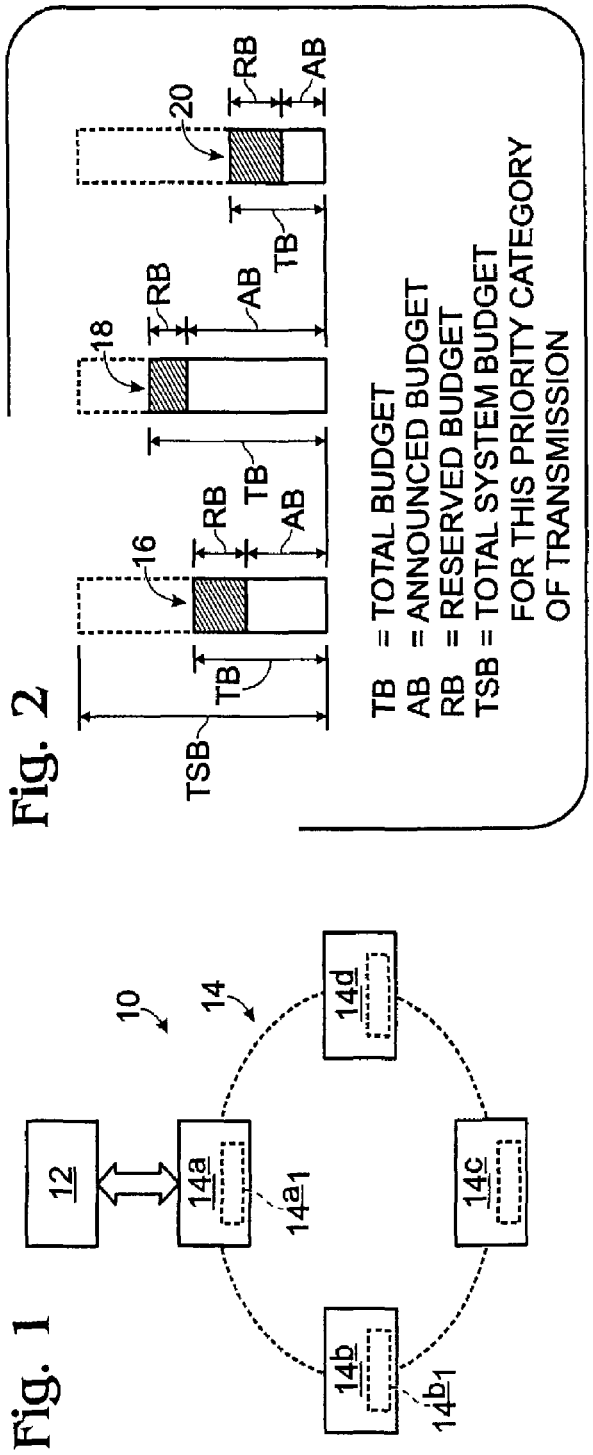

MODIFIED-BEACON, BANDWIDTH-ACCESS CONTROL IN WIRELESS NETWORK COMMUNICATION SYSTEM

CROSS REFERENCE

This application claims priority to U.S. Provisional Patent Application Ser. No. 60/424,918, filed Nov. 8, 2002 for Modified-Beacon, Bandwidth-Access Control in Wireless Network Communication System. The entirety of that provisional application is hereby incorporated herein by reference.

BACKGROUND AND SUMMARY OF THE INVENTION

This invention pertains to a method and apparatus employable in a wireless network communication system for delivering, in periodic transmission beacons, transmission budget information regarding available unused network communication bandwidth which is then competed for by communication stations that form part of a basic service set (BSS) of communicating stations in the system. More specifically, the invention relates to a modified form of beacon broadcast activity whereby the level of beacon-announced available bandwidth is calculated on the basis of prior, plural (rather than singular), inter-beacon, communication-transmission intervals.

In the description presented herein, certain letter acronyms are employed, and the following is a substantially full list of those acronyms and of their respective meanings:

| | |
|---|---|
| AP | Access Point |
| SIF | Short Interframe Space |
| ACK | Acknowledgement |
| AC | Access Category |
| RA | Receiver |
| AP MAC | Access Point Media Access Control |
| Tx Time | Transmit Time |
| PHY | Physical (Layer) |
| QoS | Quality of Service |
| MIB | Management Information Base |
| STA | Station |

In a network communication system of the type generally outlined above, and according to conventional practice, periodic transmissions called beacons take place at regular intervals within a basic service set of communicating transmitter/receiver computers (stations). Each beacon transmission conveys information to the stations in the set regarding how much bandwidth will be available for access-competition in the next, successive (following the particular beacon transmission concerned) inter-beacon transmission interval.

Beacons are created and broadcast, normally, by one of the stations in a basic service set, which station is referred to as the access point (AP) station. It is this AP station which directly links with a network, and which, therefore, acts as a network port for all stations in the associated BSS.

Announced available bandwidth is referred to as a transmission budget. In general terms, the amount of bandwidth which is announced as being available (the transmission budget) by each beacon has its level, or size, calculated, as will be outlined below, by the AP station in accordance, to some extent, with immediate, prior transmission activity which has taken place in the system. That immediate prior activity typically includes the successful communication transmission activity which occurred during the last, single inter-beacon transmission interval. Thus, such immediate prior activity normally takes into account only the successful transmissions of those particular stations which gained and used bandwidth access in the last transmission interval.

In terms of gaining bandwidth access during a transmission interval in prior art practice, each station calculates what is known as its transmission limit, and the size of this limit bears upon both how a station seeks access, and how much access a successfully seeking station actually gets. Successful transmitting stations in the last transmission interval are permitted to calculate relatively larger transmission limits than are stations which did not transmit during the last transmission interval, and thus, stations seeking "new entry" to available bandwidth are consequently placed at a competitive disadvantage. The shorter the transmission interval, of course, the fewer in number, usually, will be the collection of stations that successfully transmit during that interval. As a result, there tends to be, in relation to transmission interval length according to prior art practice, an inversely related back-up size, or line-up, of stations awaiting access.

Given the fact that, in accordance with such conventional practice, a new transmission budget is calculated for each successive beacon transmission, it is well recognized by those skilled in the relevant art, that the shorter the interval between successive beacon transmissions, the more likely it will be that regular communication back-ups, like those just mentioned, will occur with respect to newly active stations which become ready for transmission-budget access.

According to the present invention, such back-ups can be significantly reduced, and two different, but commonly grounded, ways of dealing with this kind of back-up situation are specifically proposed by this invention, and are described herein. Both involve using a larger-than-single, prior, inter-beacon transmission-interval activity history as the basis for calculating transmission budget, and each involves broadcasting to BSS stations this differently-calculated transmission budget in slightly different formats. By so calculating the transmission budget, and since it is likely that more stations' activities will be accounted for in the calculation, since the "calculation" interval is enlarged to include plural, normal inter-beacon transmission intervals, a key contributor to conventional back-ups is significantly subdued.

The various features and advantages which are offered by the invention will become more fully apparent as the detailed description which now shortly follows is read in conjunction with the accompanying drawings.

DESCRIPTION OF THE DRAWINGS

FIG. 1 is a simplified, block/schematic diagram illustrating a wireless, packet-based communication system which embodies and employs a preferred and best mode form of the present invention.

FIG. 2 is a simplified schematic diagram showing a single, or selected, illustrative transmission-budget announcement beacon which is broadcast by the system of FIG. 1. The particular beacon budget information-content which is shown forms no part of the present invention.

FIG. 3 presents a simplified, schematic diagram illustrating one style of modified transmission of beacons performed in accordance with one approach proposed by the present invention.

FIG. 4 is a simplified, schematic diagram illustrating another style of modified transmission of beacons performed in accordance with another manner of implementing and practicing the present invention.

DETAILED DESCRIPTION OF THE INVENTION

With reference now to the drawings, and focusing attention first of all on FIG. 1, here there is shown generally at 10 a packet-based wireless communication network environment, or system, which operates in accordance with the present invention. For illustration purposes only herein, network 10 takes the form of a prioritized-access (to available bandwidth) Local Area Network (LAN), but it should be understood that the invention may be employed in a wide variety of other specific forms of communication networks. Included in environment 10 is the LAN network portion per se 12 which substantially inter-connects all inter-connected and involved users, and a single BSS group 14 of plural stations, such as stations 14a, 14b, 14c, 14d. Station 14a acts as the access point (AP) controller computer, and the other three stations are simply communicating transmitter/receiver computers which form part of this basic service set. AP 14a in addition to being the controller computer in set 14, is also one of the several individual transmitter/receiver computer communicating stations in the set. All of these stations are designed to operate in accordance with certain rules, which rules are set forth generally in a descriptive section hereinbelow. With respect to these rules, all of the station-specific rules of operation which apply to the other stations in set 14 also apply to station 14a. It is station 14a, however, which is responsible for transmitting the beacons in accordance with the present invention, as is set forth in description below, and AP 14a has some additional performance rules to follow in accordance with the structure and practice of the invention.

Station Rules

Distributed Admission Control Procedures

The amount of on-air time for transmissions of a specific access category (AC) is capped with a hysteresis based distributed admission control mechanism. When the transmission budget for an AC is depleted, new nodes will not be able to gain transmission time, while existing nodes will not be able to increase the transmission time that they are already using. This mechanism protects existing flows.

Procedure at the AP

The AP shall measure the amount of time occupied by transmissions for each AC during the beacon period, including associated SIFS and ACK times if applicable. The AP shall maintain a set of counters TxTime[AC], which shall be set to zero immediately following transmission of a beacon. For each Data frame received by the AP with the RA equal to the AP MAC address, or transmitted by the AP, and which has a nonzero AC, the AP shall add to the TxTime counter corresponding to the AC of that frame, a time equal to:

a) The time on-air of the frame, including the preamble and PHY header, if the acknowledgement policy is set to "no acknowledgement".

b) The time on-air of the frame, including the preamble and PHY header, plus the duration of the acknowledgement frame and aSIFSTime if the acknowledgement policy is set to "acknowledge".

The AP shall transmit in each beacon the TxBudget for each AC contained in the QoS Parameter Set element. The TxBudget is the additional amount of time available for an AC during the next beacon period. The AP shall set the TxBudget to be:

$$TxBudget[AC]=MAX\{(aACTransmitLimit[AC]-TxTime[AC]*f[AC]), 0.0\}$$

The variable aACTransmitLimit[AC] is a MIB variable at the AP for the maximum amount time that may be spent on transmissions of a specific AC, per beacon interval. This value should be scaled to aDot11BeaconPeriod. If no admission control is applied (for a specific AC), the TxBudget shall be set to 32767, which is deemed to be infinity. Factor f[AC] is a MIB variable at the AP, which is the surplus factor for a specific AC. Normally this factor is greater than 1.0 and gives more bandwidth reservation for the existing flows. This parameter is distributed to STAs by QoS Parameter Set element. If TxBudget[AC] becomes negative, it will be set to zero.

Procedure at the Station

Stations, including the AP, shall maintain four variables for each of AC, as shown in Table I.

TABLE I

Admission Control variables at the station

| State Variable | Description |
|---|---|
| TxCounter | Counts the transmission time during this beacon interval, not including unsuccessful transmission if the transmission status is available; |
| TxUsed | All transmission time used. |
| TxLimit | Limits the counter |
| TxRemainder | Stores a possibly capped limit remainder |
| TxMemory | Memorizes the limit |

The variable TxCounter counts the amount of time occupied on-air by transmissions from this station for each specific AC, including associated SIFS and ACK times if applicable. For each data frame transmitted by the station which has a nonzero AC, no matter whether this frame successfully transmitted or not, the station shall add to the TxUsed [AC] corresponding to the AC of the frame, a time equal to:

a) The time on-air of the frame, including the preamble and PHY header, if the acknowledgement policy is set to "no acknowledgement";

b) The time on-air of the frame, including the preamble and PHY header, plus the duration of the acknowledgement frame and aSIFSTime if the acknowledgement policy is set to "acknowledge".

At the same time, the station maintains another counter, TxCounter[AC], which counts only the successful transmission if the status is known by the station. The station shall not transmit a data frame if doing so would result in the value in TxUsed[AC] exceeding the value in TxLimit[AC]. If the station is prevented from sending a frame for this reason, it may carry over the partial frame time remainder to the next beacon period, by storing the remainder in TxRemainder[AC]:

$$TxRemainder[AC]=TxLimit[AC]-TxUsed[AC]$$

Otherwise, TxRemainder[AC] shall be zero.

At each target beacon transmission time, irrespective of whether a beacon was actually received, the TxMemory, TxLimit and TxCounter state variables are updated according to the following procedure:

If TxBudget[AC]=0, TxMemory[AC] remain unchange; otherwise, $$TxMemory[AC]=f \times TxMemory[AC]+(1-f)(TxCounter[AC]*f[AC]+TxBudget[AC])$$

TxCounter[AC]=0

TxLimit[AC]=TxMemory[AC]+TxRemainder[AC]

Where the damping factor f is the MIB parameter dot11TXLimitDamping Factor[AC], which has a default value of 0.9. Damping does not affect the entrance of a new flow into the system when enough budget is available, because the decreased TxBudget is offset by an increased TxCounter instantaneously, so TxMemory does not change. The damping does affect TxMemory when a new flow starts up in another node. In that case, the decreased TxBudget is not offset by an increased TxCounter and the TxMemory will converge to the lower target value consequently.

The TxBudget that is used in this calculation shall be the budget that was most recently obtained from the AP. The TxCounter value shall be the value of the beacon period before the period that just ended (i.e. if the beacon period that just ended has index k, then TxCounter(k−1) shall be used in the calculation, instead of TxCounter(k)). Taking the earlier value accounts for the delay that occurs between the moment at which the AP determined the TxBudget and the point at which this budget will be used in the above calculations.

The value TxCounter+TxBudget is the target to which TxMemory converges. The TxLimit is equal to TxMemory plus a possible capped remainder.

TxMemory 'memorizes' the amount of resource the node has been able to spend in a specific AC. Once the budget is depleted (i.e. TxBudget hovers around 0), TxMemory converges to TxCounter, which is the lower limit. This ensures that the node will be able to continue consuming the same amount of resource in following beacon periods. The damping allows for some amount of fluctuation to occur. But TxMemory will not be able to grow any further in the saturated state. This prevents new flows from entering the specific AC when it is saturated.

Distributed Admission Control should be used for ACs with traffic that is rate capped, like video or voice.

One should envision the several blocks that represent communication stations in BSS 14 in FIG. 1 to have appropriately contained within them, via hardware, firmware and software, the appropriate structures (referred to herein as behavior structures) that will be, and are, employed in accordance with practice of the present invention to control and utilize beacon transmissions, as well as to do other things. Dashed lines within these blocks, such as those lines indicated at 14a₁, 14b₁ in blocks 14a, 14b, respectively, symbolize these behavior structures.

As was mentioned earlier herein, system 10 is one wherein network communication stations seek prioritized access to available transmission bandwidth, access that is, with regard to transmitting information that is characterizable in any one of several, different, defined categories of priority. The system thus described for illustration purposes, in addition to modifying beacon transmissions in accordance with practice of the present invention, specifically distinguishes how it behaves for each of these several, different communication categories, addressing each individually, but essentially performs for all such categories with similar features that enhance the quality of network-communication service.

This illustrative system is designed nominally to manage bandwidth allocation for system communication traffic, within each priority level of traffic, by enabling preferential bandwidth access treatment for certain stations. While the present invention does not in any way include consideration of such preferential treatment, when employed in a system, such as system 10 which offers this treatment, it greatly enhances performance of such a system.

Such bandwidth-allocation preferential management is accomplished by the way in which content in the beacons is constructed. In system 10, beacons that announce available bandwidth in accordance with the invention are constructed to announce, as being accessible, a particular, certain amount of available unused bandwidth (the "transmission budget"), which amount is "intentionally stated" to be less than the true, full amount. The undisclosed difference acts as a reserve of available bandwidth capacity, and this reserve ultimately acts to improve network communicativity.

This "reserve" approach recognizes that network communication quality of service can be improved where "currently transmitting" stations are allowed a certain deferential treatment with regard to access to available bandwidth, so that the network system does not compromise communication quality by failing either to recognize the fact that a currently communicating station (a) may need some additional bandwidth to complete transmission activity in which it is already engaged, or (b) need such additional bandwidth to deal with the possibility that a currently transmitting station has had certain recently attempted communications fail by virtue of some kind of a communication error. This difference is allowed where, as in system 10, the participating BSS stations behave in a kind of self-governing manner with regard to how they seek to access additional bandwidth. Those stations that are not "currently" in the immediate above-mentioned (a) and (b) situations, and which wish to obtain transmission bandwidth during a current, new beacon interval, establish for themselves a relatively small, requestable transmission bandwidth, referred to herein as a small transmission "limit". Those stations, however, which are in at least one of these two situations are allowed to establish appropriate larger transmission "limits", thus to be self-enabled to request more of the actual additional available bandwidth, including the unannounced, reserved bandwidth.

There are thus actually available, in accordance with each "effective" beacon-transmission budget announcement in accordance with practice of the present invention, two types of unused available bandwidth, one of which is directly announced to all stations in a BSS, and the other of which is not announced to any of these stations, but which rather is held as a reserve of unannounced available bandwidth that can be accessed, for example, during the next "effective" beacon transmission, principally by any one or more of the transmitting stations which were actively transmitting during the prior beacon time period. The term "effective" relates to practice of the present invention and will be explained shortly. The amount of such reserved bandwidth is based, in part, upon prior, plural-beacon-interval system-activity history, from which history the AP station performs a calculation about how much of the available unused bandwidth to announce for the transmission budget.

FIG. 2 in the drawings illustrates a typical, single beacon-communication announcing an available transmission budget which is constructed in accordance with the "reserve" practice just generally outlined. Here, at 16, is shown this illustrative beacon. Schematically speaking, the overall height (TB) of beacon 16 represents the total available budget. The height (AB) of the unshaded area represents the actual amount of transmission budget which is announced to all stations in BSS 14 by AP 14a, and the height (RB) of the shaded region indicates the then reserved bandwidth, discussed above. Total system bandwidth is represented by the height (TSB) of the upwardly projecting dashed-line extension of beacon 16.

From "effective" beacon to successive "effective" beacon, the height measurements (TB), (AB), (RB) may change appropriately.

Describing now in detail the modified-beacon transmission structure and practice of the present invention, attention is first directed to FIG. 3 along with FIGS. 1 and 2. Shown in FIG. 3 generally at 30 is an array, or established pattern, of time-spaced beacon transmissions, certain ones of which have been modified in format in accordance with the present invention. In array 30, seven regularly timed spaced beacons are shown at 32, 34, 36, 38, 40, 42, 44. Each adjacent two of these beacons are spaced apart by a common time interval which is labeled I in FIG. 3. This interval, also referred to herein as a defined first time spacing, is typically one that has been pre-set for a given BSS, such as B14, and a typical time interval I might reside in the range of about 20- to about 1,000-milliseconds. For the purpose of understanding the present invention, the exact length of interval I is not critical. It should be noted, however, that the advantages offered by practice and implementation of the present invention are more apparent in systems wherein the inter-beacon transmission interval I between successive normal beacons lies toward the lower end of the just-mentioned range.

According to implementation and practice of the invention, as such is illustrated in FIG. 3, only every third beacon (and in FIG. 3 this includes beacons 32, 38 and 44) is "selected", and carries transmission budget information like that illustrated in previously described beacon 16, with the intervening beacons 34, 36, and 40, 42, pointedly not being "selected", and not carrying such information. The transmission budget information which is carried by beacons 32, 38, 44 is based fundamentally, and in accordance with the invention, upon calculations which reflect successful station transmission activities that have taken place in the last, immediate-preceding, "larger" time interval that exists between the selected, budget-communicating beacons, such as beacons 32, 38, 44. In other words, and referring specifically to what is conveyed by beacon 38, the transmission budget information conveyed by this beacon is calculated on the basis of successful station transmitting activity which has taken place in the interval marked interval A in FIG. 3. Interval A spans the time distance between beacons 32 and 38. Similarly, an Interval B is shown in FIG. 3 as the interval between beacons 38, 44 with respect to which successful station transmission activity is employed to calculate a new transmission budget which will be broadcast to all relevant stations in a BSS by beacon 44. The time-spaced arrangement seen in FIG. 3 for beacons 32, 38, 44 is referred to herein as a chosen sub-pattern of beacon transmissions having a defined second time spacing. The budget "levels", or amounts, which actually get communicated are managed by the "reserve" practice outlined earlier herein.

Thus, and according to this embodiment of and manner of practicing the invention, only certain, selected beacons which are farther apart in time than a single, normal beacon interval, and namely are further apart than a specific, plural number of "normal" beacon intervals, effectively carry new transmission budget information. Intermediate beacons do not carry this information, and calculations of available transmission budget are performed within larger time intervals (like Intervals A, B) wherein it is likely that more communicating stations will succeed in their respective transmission communication efforts. By recalling the discussion above with respect to how communication back-ups occur, one can thus see how this embodiment of the invention can yield improvement in this area of prior art concern.

In FIG. 4, another array 50 of plural transmission beacons is shown, in which array regularly time-spaced beacons 52, 54, 56, 58, 60, 62, 64 are presented. Pictorially, array 50 is very much like previously described array 30. In array 50 also, it is every third beacon which plays a special role (is made "effective") in accordance with this embodiment and manner of practicing the invention. Accordingly, and in this seven-beacon array (50), it is beacons 52, 58, 64 which have been selected (for illustration purposes) to be the distinguishing beacons whose behaviors are modified so that they are the only beacons in the array which transmit new budget information. In this arrangement and embodiment of the invention, however, all beacons convey transmission budget information, with a difference between practice here and conventional practice being that those beacons which are intermediate the new-budget-transmitting beacons, and namely, in FIG. 4 intermediate beacons 54, 56 and 60, 62, do not convey any changed or new budget-transmission information. Rather, they simply re-broadcast the same transmission budget information which was broadcast by their respective predecessor, new-budget-announcing beacons, namely, beacons 52, 58 in the cases of beacons 54, 56 and 60, 62, respectively.

In addition to this kind of proposed re-configuring or re-formatting of otherwise conventional budget-transmitting beacons, all beacons in array 50 transmit additionally what is referred to herein as an index number which tells receiving stations in a BSS, such as BSS 14, just where, in the enlarged beacon interval, such as Intervals A and B also pictured in FIG. 4, the system is with respect to the passage of time within one of these larger intervals. As an illustration, beacons 52, 58, 60, in addition to announcing new budget information which is calculated in relation to the last prior larger-interval transmission activity history, also transmit an index number which might, for example, be index number 0. This index number announces to stations in the relevant BSS that they are "entering" the first one-third of the total time period that will exist in larger Interval A, For example, beacon 54 transmits, in addition to a repeat of the same budget information newly presented by beacon 52, an index number, such as the index number 1, which then tells all stations in the relevant BSS that they entering the second third of the larger transmission Interval A. Similarly, beacon 56 might transmit, for example, the index number 2 to indicate to relevant BSS stations that they are "entering" the third and final portion of Interval A. Following beacon 58, which, of course, transmits a new transmission budget, this beacon additionally transmits, as did previously described beacon 52, an index number, such as index number 0.

According to this embodiment of the invention, intermediate beacons, such as beacons 54, 56 and 60, 62 in array 50 in FIG. 4, by transmitting ascending index information following the index information transmitted by their "leading" predecessor" beacons, such as beacons 52, 58, help the BSS stations in various ways to determine just how to employ their respective requests for access to available transmission bandwidth.

Thus, one can see how this approach to implementing the present invention utilizes a modified beacon configuration to address the problem discussed earlier herein of communication traffic back-up.

In both of the illustrated and described embodiments of the invention, the behavior structures which are included in the group stations operate (a) to select from the normal periodic pattern of beacon transmissions a more largely time-spaced sub-pattern of "chosen" beacon transmissions, and (b) to effect utilization, within the station group, of only those "chosen" beacon transmissions in the sub-pattern to convey the announcements of any new (changed) transmission-budget information.

Accordingly, while preferred and modified forms of, and manners of practicing, the invention have been described and illustrated herein, those generally skilled in the art will appreciate that other suitable variations and modifications may be made without departing from the spirit of the invention.

I claim:

1. A method employable in a wireless communication network for managing, among plural communication stations in a group of such stations, bandwidth-sharing of available, unused bandwidth, said method comprising:

establishing a pattern of periodic beacon transmissions having a defined first time spacing between time-next-adjacent transmissions, designed to convey bandwidth-availability (transmission-budget) announcements to stations in the group, from within this pattern, choosing a sub-pattern of selected, periodic beacon transmissions having a defined second time spacing between time-next-adjacent, chosen sub-pattern transmissions, which second time spacing encompasses a predetermined number of the beacon transmissions having the mentioned first time spacing, and utilizing, then, only the selected beacon transmissions in this sub-pattern to convey the announcements of any new (changed) transmission-budget information.

2. The method of claim 1, wherein, in accordance with said utilizing step, only beacons in the chosen sub-pattern of transmissions convey any transmission-budget information.

3. The method of claim 1, wherein the non-chosen beacon transmissions convey only a repetition of the same transmission-budget information which was conveyed by the last, immediate, prior, chosen beacon transmission.

4. Apparatus employable in a wireless communication network for managing, among plural communication stations in a group of such stations, bandwidth-sharing of available, unused bandwidth, said apparatus comprising an access point station designed as such from within such a group to be operable to establish a pattern of periodic beacon transmissions having a defined first time spacing between time-next-adjacent transmissions, and constructed to convey bandwidth-availability (transmission-budget) announcements to stations in the group, and means provided within each of such stations, operable, with respect to and from within the mentioned pattern of beacon transmissions, (a) to choose a sub-pattern of selected, periodic beacon transmissions having a defined second time spacing between time-next-adjacent, chosen sub-pattern transmissions, which second time spacing encompasses a predetermined number of the beacon transmissions having the mentioned first time spacing, and (b) to effect utilization, then, of only the selected beacon transmissions in this sub-pattern to convey the announcements of any new (changed) transmission-budget information.

* * * * *